UNITED STATES PATENT OFFICE.

JAMES E. SUMMERS, OF RICHMOND, VIRGINIA, ASSIGNOR TO THE AMERICAN CHAMPION PLASTER COMPANY, OF SAME PLACE.

PLASTERING COMPOUND.

SPECIFICATION forming part of Letters Patent No. 558,435, dated April 14, 1896.

Application filed October 2, 1895. Serial No. 564,452. (No specimens.)

*To all whom it may concern:*

Be it known that I, JAMES E. SUMMERS, of Richmond, in the county of Henrico and State of Virginia, have invented a new and useful Improvement in Plastering Compounds, of which the following is a specification.

The object of my invention is to provide an improved plastering compound for use upon laths as a first or second coat; and it consists of a dry composition composed of furnace-slag, slaked lime, plaster-of-paris, hydraulic cement, flour of grain, and fiber in the proportion as follows: furnace-slag, seven hundred and forty-nine pounds; slaked lime, one hundred and twenty-five pounds; plaster-of-paris, one hundred and thirty pounds; hydraulic cement, twenty-five pounds; wheat-flour, six pounds; vegetable fiber, four and one-half pounds.

The slag is crushed or ground so that the particles will be no larger than sea-sand, and not over twenty-five per cent. will be as coarse as this. The lime is dry-slaked.

The above ingredients are thoroughly mixed into a homogeneous dry mass by pouring the proportionate parts into a bin communicating with a mixer of approved capacity, from which it emerges into bags and is weighed by an automatic weighing attachment.

This material is to be mixed or tempered with water in a box which may be situated in the room being plastered, into which box the bagged material may be emptied and the water poured in. It is designed for use upon any kind of laths, either of wood, wire, perforated metal, &c., and may also be used upon brick or stone, but is needlessly expensive for such use, as upon brick or stone more body can be given, and there being less vibration and shrinkage less cement and plaster would be required.

The lime, plaster, and cement exercise their usual well-known functions. The slag, besides giving grit and body, has cohesive qualities of its own when finely crushed and adds strength to the material. The vegetable fiber is unaffected by the chemical action of the lime or other ingredients, and adds strength and tenacity to the plaster. The flour retards the "set," so as to make the material set within the time desired, and adds toughness to the plaster. In the proportions indicated the product sets in about one hour, giving the workman ample time to work up the material on the board. It hardens in about two hours after it is put on, and the wood-finishing or trimming out of the building with the woodwork may be commenced the same day.

I am aware that the ingredients named by me have been separately used in various combinations for plastering compositions, and I therefore only claim the special composition in or about the proportions described, which forms a novel and useful product of distinctive value.

Having thus described my invention, what I claim as new, and desire to secure by Letters Patent, is—

The plastering composition herein described consisting of furnace-slag, slaked lime, plaster-of-paris, hydraulic cement, the flour of grain, and vegetable fiber mixed in or about the proportions described.

JAMES E. SUMMERS.

Witnesses:
J. H. OGBURN,
RICHARD EPPES.

References:

Adams,    525,804, Sep. 11, 1894, (Art. S.L.& C., Plastering, Retarders)

Pick,     281,395, July 17, 1883,        "        "        "        "

and British patents to Clark, #368 of 1873 and Hitchins, #6804 of 1886.